(12) United States Patent
Adhar

(10) Patent No.: US 10,498,772 B2
(45) Date of Patent: Dec. 3, 2019

(54) METHOD AND SYSTEM FOR DIGITAL PRIVACY MANAGEMENT

(71) Applicant: Vireshwar K. Adhar, Ryde (AU)

(72) Inventor: Vireshwar K. Adhar, Ryde (AU)

(*) Notice: Subject to any disclaimer, the term of this patent is extended or adjusted under 35 U.S.C. 154(b) by 363 days.

(21) Appl. No.: 15/462,517

(22) Filed: Mar. 17, 2017

(65) Prior Publication Data

US 2017/0272472 A1 Sep. 21, 2017

Related U.S. Application Data

(60) Provisional application No. 62/310,876, filed on Mar. 21, 2016.

(51) Int. Cl.
*H04L 29/06* (2006.01)
*G06F 21/60* (2013.01)
*G06F 21/62* (2013.01)

(52) U.S. Cl.
CPC .......... *H04L 63/205* (2013.01); *G06F 21/602* (2013.01); *G06F 21/6218* (2013.01); *H04L 63/061* (2013.01); *H04L 63/105* (2013.01); *H04L 63/1425* (2013.01); *H04L 63/1433* (2013.01)

(58) Field of Classification Search
CPC ... H04L 63/205; H04L 63/061; H04L 63/105; H04L 63/1452; H04L 63/1433; G06F 21/602; G06F 21/6218
See application file for complete search history.

(56) References Cited

U.S. PATENT DOCUMENTS

| 8,776,168 | B1* | 7/2014 | Gibson | H04L 63/104 709/225 |
| 8,793,151 | B2* | 7/2014 | DelZoppo | G06Q 10/0635 705/7.28 |
| 2007/0156696 | A1* | 7/2007 | Lim | G06F 21/6218 |
| 2008/0016563 | A1* | 1/2008 | McConnell | G06F 21/577 726/22 |
| 2009/0254993 | A1* | 10/2009 | Leone | G06F 21/51 726/25 |
| 2010/0162347 | A1* | 6/2010 | Barile | G06F 21/552 726/1 |

(Continued)

FOREIGN PATENT DOCUMENTS

WO WO-2015054697 A1 * 4/2015 ........... G06Q 20/382

OTHER PUBLICATIONS

Jabbour et al., Policy-Based Enforcement of Database Security Configuration through Autonomic Capabilities, Mar. 2008, Fourth International Conference on Autonomic and Autonomous Systems, pp. 188-197 (Year: 2008).*

*Primary Examiner* — Kenneth W Chang
(74) *Attorney, Agent, or Firm* — Christopher Peil; Law Office of Christopher Peil

(57) ABSTRACT

Data Privacy Manager (DPM) solution includes a number of different components performing data security procedures (encryption, masking, tokenization, Anonymization, etc.) at the folder, file, email, application, database and column levels. These include components such as Key Manager, File Manager, File Agent, Email Agent, Database Manager, Database Connector, the Token Manager, Security Risk Controller and Fraud Predictor. All these components can be managed through a management console.

20 Claims, 10 Drawing Sheets

(56) References Cited

U.S. PATENT DOCUMENTS

| | | | |
|---|---|---|---|
| 2011/0131122 A1* | 6/2011 | Griffin | G06Q 40/00 |
| | | | 705/35 |
| 2013/0097701 A1* | 4/2013 | Moyle | G06F 21/552 |
| | | | 726/22 |
| 2013/0191650 A1* | 7/2013 | Balakrishnan | G06F 21/6227 |
| | | | 713/190 |
| 2014/0075501 A1* | 3/2014 | Srinivasan | G06F 21/62 |
| | | | 726/1 |
| 2014/0208100 A1* | 7/2014 | Kendall | H04L 9/0863 |
| | | | 713/164 |

* cited by examiner

METHOD AND SYSTEM FOR DIGITAL PRIVACY MANAGEMENT

CROSS REFERENCE TO RELATED APPLICATIONS

This application claims benefit of U.S. provisional patent application Ser. No. 62/310,876, filed Mar. 21, 2016, the entirety of which is incorporated herein.

BACKGROUND

Technical Field

In general, the present disclosure relates to the field of data security. More particularly, the present disclosure relates to a method and system for digital privacy management.

Background Information

In modern enterprises, networked computing environments may include cloud-based storage and services, on-premises workers, home-based workers and independent contractors working off-site. Such complex computing environments pose a substantial risk both of internal and external attacks. In spite of these data security risks, it is commonplace for enterprises to fail to take adequate measures to prevent such attacks from occurring. For example, data may be stored as 'clear text,' clearly visible to potential attackers. Or, even if data is encrypted, the cryptographic keys are also stored on the same servers as the encrypted data. Neither approach is very secure. It is not surprising, then, that many enterprises have been victims of cyber-attacks, in which unprotected confidential information (credit card numbers, patient records, insurance data, etc.) has been stolen or compromised, even though the data was stored, presumably 'safely,' within the enterprise network. The costs of these attacks often include financial loss, productivity loss, and credibility loss that can be permanently damaging. There is a need to provide security beyond legacy architecture to protect against both external and internal attacks.

SUMMARY

Data Privacy Manager (DPM) solution includes a number of different modules performing data security procedures (encryption, masking, tokenization, anonymization, etc.) at the file, folder, email, application, database and column levels. These include modules such as Key Manager, File Manager, File Agent, Email Agent, Software Security Module Agent, Database Manager, Database Connector, Token Manager, Multitenancy Manager, Security Risk Controller and Fraud Predictor. All these components can be managed through a management console which can be browser based or thin or thick client based, or via APIs.

DETAILED DESCRIPTION

The DPM solution includes a number of different components performing data security procedures (encryption, masking, tokenization, anonymization, etc.) at the file, folder, email, application, database and column levels. These include components such as Key Manager, File Manager, File Agent, Email Agent, Software Security Module Agent, Database Manager and Database Connector, Token Manager, Multitenancy Manager, Security Risk Controller and Fraud Predictor. Each DPM component has a management console to allow system admins to configure and maintain the components or it can be managed via APIs.

Figure 1:
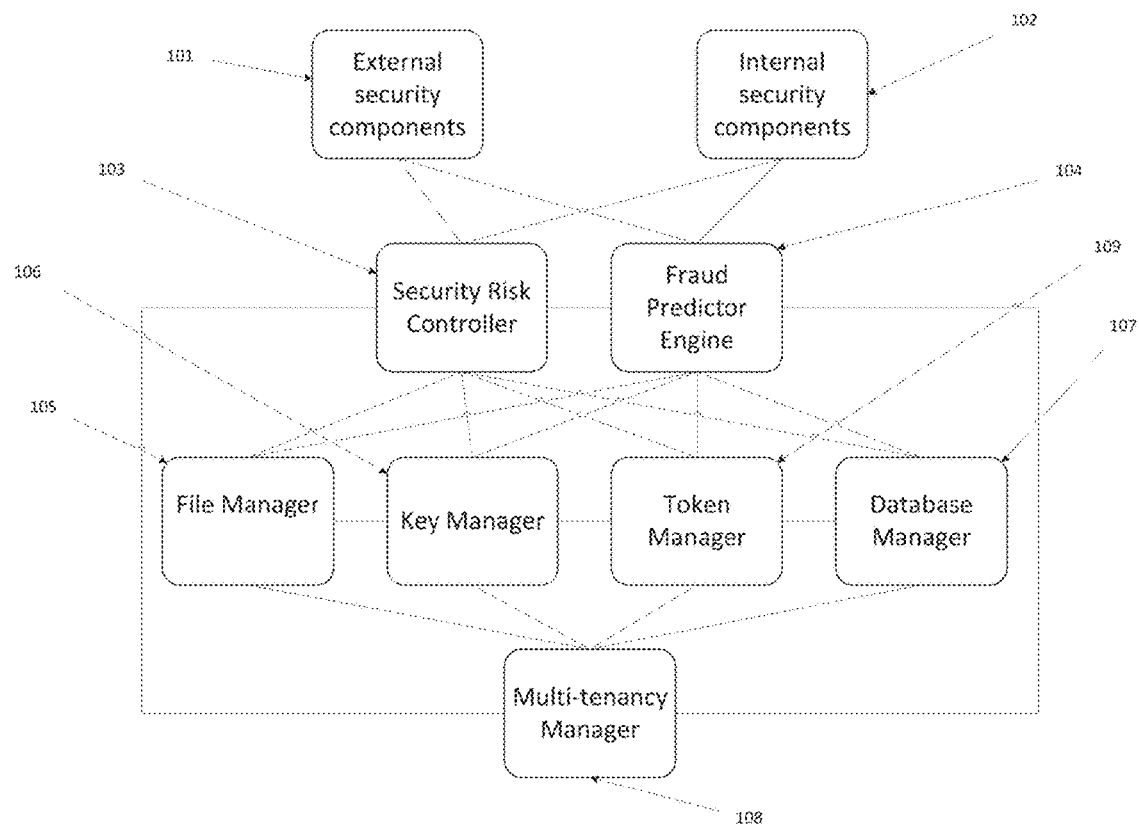
FIG. 1 provides an architecture diagram of a system for data privacy management.

FIG. 1 illustrates components and architectural diagram of the DPM solution. In embodiments, a DPM solution may include DPM File Manager 105, DPM Key Manager 106, DPM Token Manager 109, DPM Database Manager 107, DPM Multi-Tenancy Manager 108, DPM Security Risk Controller 103 and DPM Fraud Predictor 104. DPM Security Risk Controller 103 and DPM Fraud Predictor 104 interface to external security components 101 which are 3rd party devices and software and internal security components 102 to receive environment information.

Data Privacy Manager is a solution that enables users to easily protect data on any application, database or file. With the Data Privacy Manager, users can protect their data without any software code changes.

Capabilities:

Software based solution for protecting data;

Runs on Windows or Linux systems and is virtualization-ready;

Can protect both structured and unstructured data;

Protects data onsite, in the cloud and hybrid onsite/cloud;

Includes encryption, tokenization, masking and anonymization;

Flexible choice of encryption keys, software-generated or integrated with Software Security Module (SSM) or Hardware Security Module (HSM) or Quantum Random Number Generator (QRNG) or (BYOE) (bring your own encryption algorithm);

Storage and execution of DPM application secrets in CPU hardware security-assisted vaults on the same platform on which the DPM applications are running; and Hardware-assisted SSM that securely vaults encryption keys, key generation, password and application secrets used by applications.

In embodiments, Data Privacy Manager includes at least the following modules:

DPM Database Manager 107: allows the masking of data stored in columns within databases. Integration with DPM Token Manager extends its features to encryption, tokenization and anonymization;

DPM File Manager 105: enables encryption and access control of files, folders, emails, applications, databases, SSM vaults stored on mobile devices, laptops, desktops and servers;

DPM Token Manager 109: encrypts, tokenizes and anonymizes data through an API (application programming interface). It also allows creation of masking rules for authorized and unauthorized users;

DPM Key Manager 106: provides a central place for key management lifecycle. Allows generation of keys internally in software or SSM or HSM or QRNG or BYOE;

DPM Security Risk Controller 103: provides dynamic modification of security policies for DPM components by increasing or reducing security levels;

DPM Fraud Predictor 104: provides identifying and reporting users at risk for engaging in behavior malicious to the enterprise; and DPM Multi-tenancy Manager 108: provides easy management by hosting multiple instances of DPM File, DPM Token Manager, DPM Key Manager, DPM Database Manager, DPM Security Risk Controller and DPM Fraud Predictor in multi-tenancy environments.

Figure 2:
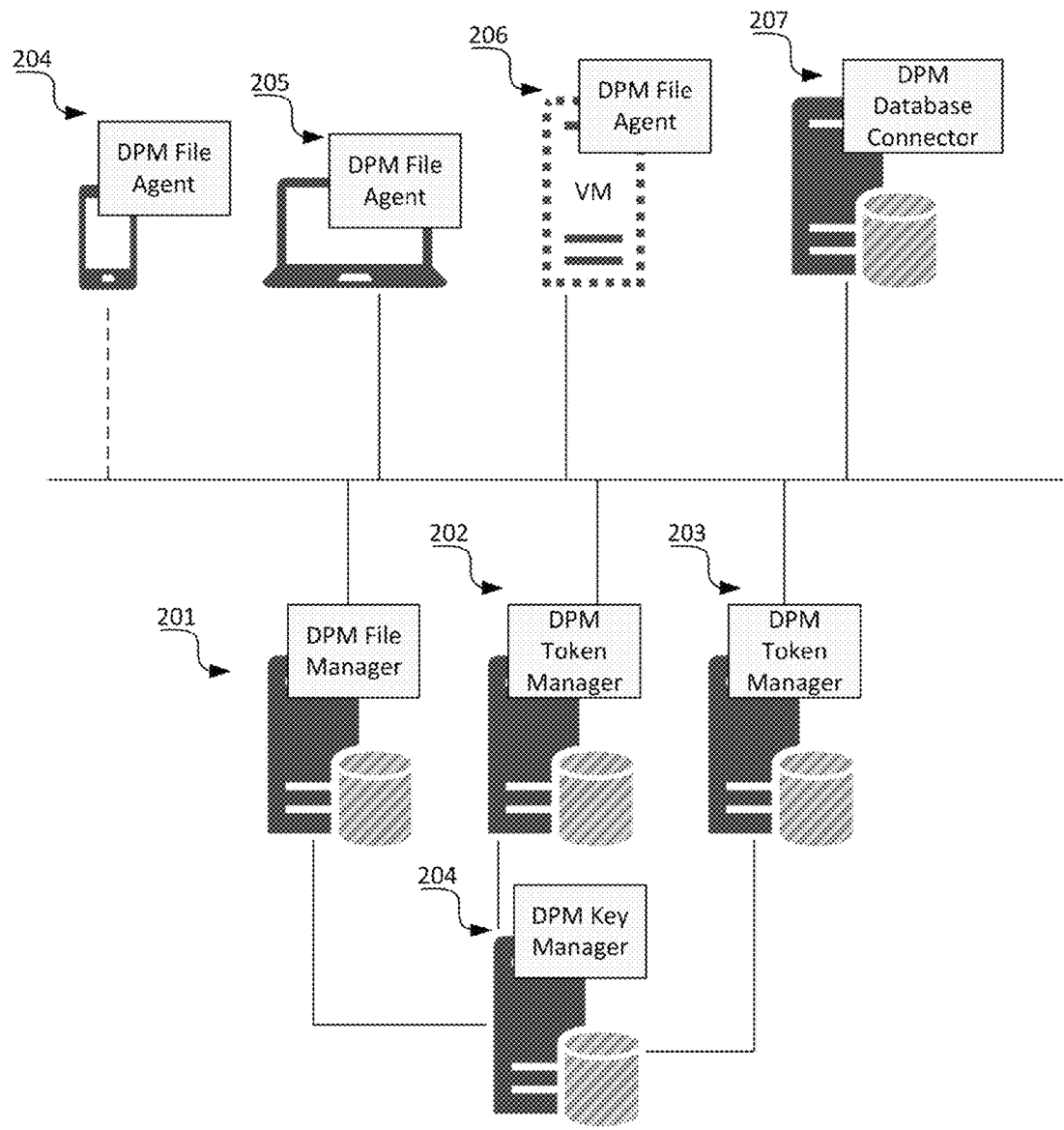
FIG. 2 provides an example of a deployment architecture.

FIG. 2 provides an example of deployment architecture of DPM solution into a computing environment. DPM File Manager 201, DPM Token Manager 202, DPM Database Manager 203, and DPM Key Manager 204 are deployed on the systems with backend database. DPM File Agents are deployed on a server 206, laptop 205 and mobile device 204. DPM Database Connector 207 is deployed on a database server. DPM File Manager 201 and DPM Token Manager 202 receive encryption keys from DPM Key Manager 204. DPM File Manager 201 manages policies for DPM File Agents. DPM Database Manager 203 manages policies for DPM Database Connector 207.

DPM Database Manager 107

DPM database manager 107 allows users to protect data in a column in a database. It provides masking of data and by integrating with Token Manager, it also can provide tokenization, encryption and anonymization of target data. DPM database manager provides a way for users to protect data stored in databases without having to make any application code changes.

Figure 5:
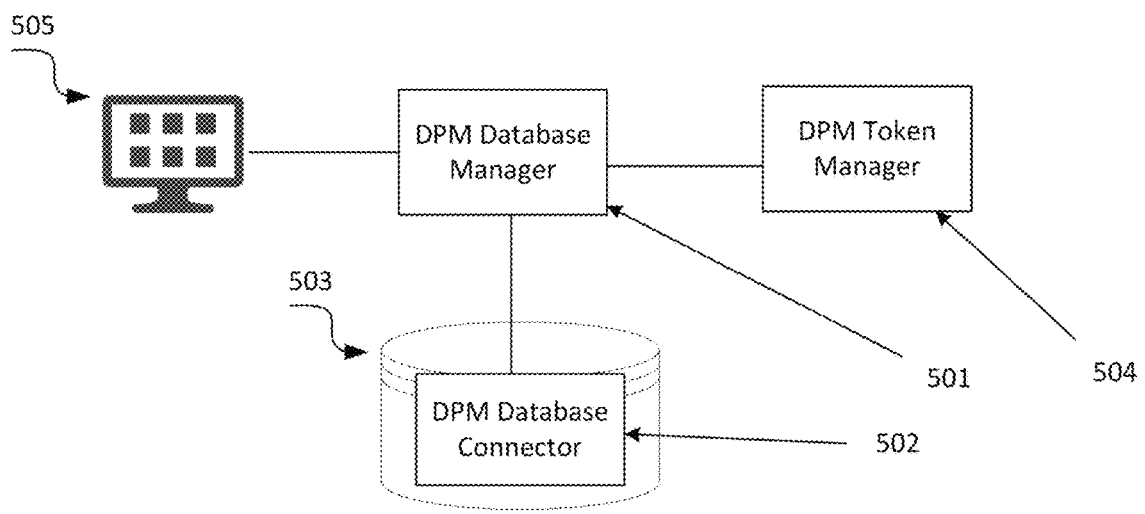
FIG. 5 provides an architecture diagram of a database manager.

FIG. 5 illustrates an architecture of DPM Database Manager 107. DPM Database Manager 107 includes DPM Database Manager 501 and DPM Database Connector 502. DPM Database Connector is deployed within a database server 503. DPM Database Manager can interface to DPM Token Manager 504 to tokenize data. DPM Database Manager provides a management console 505 which is used to configure system settings and data protection policies.

The DPM Database Manager 107 may have any of the following capabilities:
- Masking of column-level data with no application code changes;
- Integrates with Token manager for tokenization, standard encryption, format preserving encryption and anonymization;
- Dynamic tokenization, anonymization and masking rules;
- Not limited in the number of columns that can be tokenized, encrypted anonymized or masked;
- Dynamic security policy enforcement by Security Risk Controller;
- Identification of authorized and unauthorized users' activities for the Fraud Predictor:
- Integrating with 3rd party Data Classification systems for structured data so as to automatically enforce DPM policies per enterprise classification policy; and
- Integrating with 3rd party sensitive data identification systems for structured data so as to automatically enforce DPM policies per enterprise wide sensitive data location policies;

Data protection policy options may include:
- Tokenization Policy: The data in the column is protected by a tokenization policy. The original data is replaced by tokens. The system administrator may choose the type of tokenization policy to apply:
  - tokens may be the same format as the original data or may have a different format;
  - tokens may preserve parts of the head or tail of the original data;
  - tokens may have a one-to-one mapping or one-to-many mapping with the original data;
  - Tokens may be random, sequential or dictionary based;
- Encryption Policy: The data in the column is protected by an encryption policy. The original data is replaced by encrypted cipher text. The system administrator may choose the type of encryption policy to apply:
  - The key to use for the encryption can be selected;
  - Format preserving encryption can be used;
  - Non-format preserving encryption can be used; and
  - As Bring Your Own Encryption (BYOE) is supported, the user can optionally choose to supply his/her own preferred encryption algorithm.
- Masking Policy: The data in the column is protected by a masking policy. The column is not replaced, but instead is dynamically changed when a query is made on the column. The system administrator may choose the type of masking policy to apply:
  - The type of masking character;
  - Masking can be applied in addition to tokenization policy, so that part of the tokens or original data are masked; and
  - Masking can be applied in addition to encryption policy, so that part of the encrypted text or original data is masked.
- Anonymization Policy: The data in the column is protected by an anonymization policy. The original data is replaced by anonymized data. The system administrator may choose the type of anonymization policy to apply such as but not limited to:
  - Hiding;
  - Masking;
  - Hashing;
  - Permutation;
  - Shift;
  - Truncation;
  - Prefix;
  - Suffix; and
  - Fictitious data.

Data migration and real-time application usage includes a variety of capabilities:
- Initial Migration—DPM Database provides a method for the user to migrate existing data. The software is designed to work on existing databases that may already contain large amounts of data that requires protection;
- Users of the software may design a policy to protect the column level data. The policy can state whether anonymization, tokenization, encryption or masking will be used to protect the data. For tokenization and encryption, it is necessary to tokenize or encrypt existing data created prior to the policy creation;
- DPM Database Manager 107 provides a method of anonymizing, tokenizing or encrypting the existing data in a fast and efficient manner. DPM Database Manager can identify which rows require anonymization, tokenization or encryption and will perform the anonymization, tokenization or encryption. The results can then be updated on the table so that protected columns contain anonymized, tokenized or encrypted values, instead of the original values;

OLTP (online transaction processing)—As normal database operations occur on the protected columns, new data items can be inserted, updated or deleted from the tables containing the protected columns. DPM Database allows the data in these columns to be anonymized, tokenized or encrypted before being inserted into the column in such a way that the database user is not aware of the, anonymization, tokenization or encryption operations;

Database User Access—DPM Database allows system administrators to determine levels of access to protected columns for database users. The following types of column access are allowed:

See original data—the tokenized, encrypted or masked column value can be reversed sob that the user can see the original value. Anonymized data is not reversible;

See encrypted data—for columns protected by an encryption policy, the user is only allowed to view the encrypted data. The rule can be further defined to allow the user to see part of the encrypted data or original data;

See tokenized data—for columns protected by a tokenization policy, the user is only allowed to view the full token. The rule can be further defined to allow the user to see parts of the token or the original data;

See masked data—for columns protected by a tokenization, encryption or masking policy, the user is only allowed to see masked data. The rule can be further defined to allow users to see parts of the masked data or original data.

DPM Database Manager 107 provides audit and system information to DPM Security Risk Controller 103 and DPM Fraud Predictor 104. DPM Database Manager 107 can accept instructions from Security Risk Controller 103 and dynamically change and enforce policies as risk levels change.

DPM File Manager 105

DPM File Manager 105 allows users to secure files, folders, emails, SSM vaults, applications and databases in mobile devices, Windows and Linux environments. DPM File Manager is designed so that end users do not need to change their behavior in order to secure their files.

Figure 6:
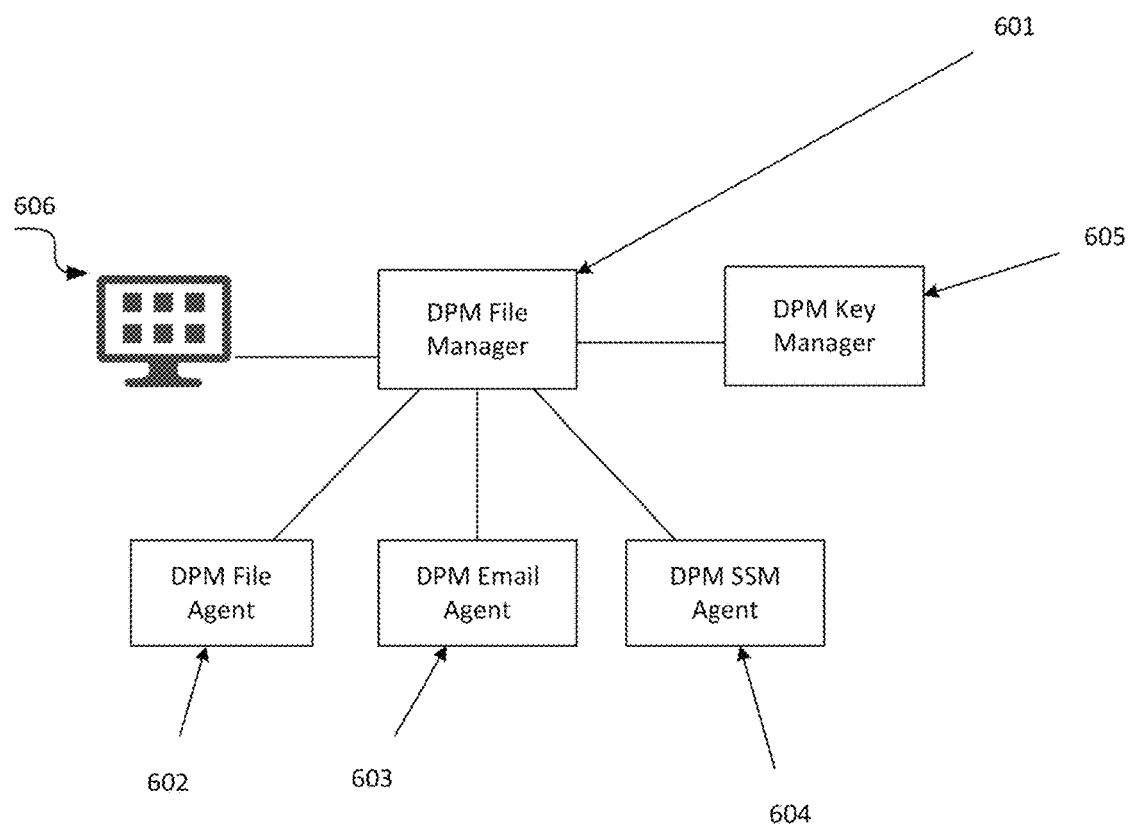
FIG. 6 provides an architecture diagram of a file manager.

FIG. 6 illustrates an architecture of DPM File Manager 105. It includes DPM File Manager 601, DPM File Agent 602, DPM Email Agent 603 and DPM SSM Agent 604. DPM File Manager 601 can interface to DPM Key Manager 605 to receive encryption keys. DPM File Manager 601 provides a management console 606 which is used to configure system settings and data protection policies.

DPM File Manager 105 may include one or more of the following capabilities;

Runs in Windows and Linux environments and mobile devices;

Transparent encryption of files on mobile devices, laptops, desktops or servers;

Encryption of email attachments and messages;

Software vaulting of application secrets such as keys, key generation and passwords used by applications;

Allows protection of data files residing on web/app/database/file servers;

Security protection policies are managed from a central point by administrators;

Protection from unauthorized users, system administrator and root users;

Application white and black list control for sensitive files;

Dynamic enforcement of security policies as communicated by Security Risk Controller 103;

Identification of authorized and unauthorized user activities for providing to the Fraud Predictor 104;

Optionally integrates with Key manager 106, SSM, HSM or QRNG or BYOE;

Storage and execution of DPM File application secrets in CPU hardware security assisted vaults on same platform in which DPM File applications are running Perimeter defense provides protection of data from leakage outside of secure locations;

Multitenancy support 108;

Integrates with third party sensitive Data Identification systems. The DPM File Manager 105 and integrated solutions work together to scan for sensitive data, which, if found to breach location policies, is automatically encrypted based on enterprise security policy; and Integrates with third party Data Classification systems. The DPM File Manager 105 integrated solution automatically enforces enterprise encryption and ACL (Access Control List) policies based on data classification policies developed.

DPM File Manager 105 provides a central place for an administrator to configure security policies and to distribute those policies to end user agents. File Manager Server 601 is responsible for the management of key, security policy and data privacy permissions, provides central AAA (authentication, authorization and accounting) services, dispatches security policies to agent and collects alarm messages from the DPM File Agent 602.

DPM File Agent 602 runs on each mobile device, laptop, desktop or server in order to secure the data. It executes security control based on the security policies from File Manager Server 601 and monitors user's behavior and sends alarms to File Manager Server 601. DPM File Agent 602 is designed to run in the background; users do not need to change user behavior and workflow in order to start using the software;

DPM Email Agent 603: run on mobile device, laptop and desktop email systems in order to encrypt email messages and attachments based on security policies configured in the DPM File Manager 105;

DPM Software Security Module (SSM) Agent 604 runs on each mobile device, laptop, desktop or server in order to secure application keys, generate keys, passwords, root certificate and other secrets. SSM Agent 604 executes security control based on the security policies from File Manager Server 601 and uses existing application hardware-assisted security features of the CPU to vault secrets. SSM agent 604 enforces confidentiality and integrity even in compromised systems of privileged malware at the OS and BIOS of physical and virtualized computers. The SSM features can be configured to provide limited key management functionality as described in DPM Key Manager 106 or limited functionality to act as a security vault. The SSM provides security functionality similar to that of a HSM, but it is also suited to virtual and cloud environments compared to alternative physical hardware architecture. Chip manufacturers have improved security and provide hardware-assisted containerization and as such, SSM can offer similar or higher security than HSM.

DPM File Manager management console 606 supports a "separation of three powers" model. There is no super admin user having all permissions. System admin is responsible for system maintenance. Security admin is responsible for design of a security policy and setting file permissions. Audit admin is responsible for reviewing log records. DPM File Manager console 606 also supports role-based access control model.

DPM File Manager 105 monitors health status of an Agent deployed on the network. DPM File Manager provides audit and system information to DPM Security Risk Controller 103 and DPM Fraud Predictor 104 and is able to accept instructions from Security Risk Controller 103 to dynamically change and enforce policies as risk levels change.

DPM File Manager 105 provides a security framework environment for sensitive data protection. First, users must pass strong authentication to logon to this security framework environment. Then, the user gets his/her own security environment with security policies and permission from server, and can access sensitive data-based context-aware ACL (access control). All user activities are audited and raise an alarm in the event of any unauthorized access attempt. When a user logs off, the security policy continues to be enforced, resulting in all sensitive data no longer being accessible.

DPM File Manager provides the following functions:
Context-Aware File Permission Management;
Supports an RBAC (Role-based access control) access control model, implement fine-grained dynamic access controls according to a predefined context-ware ACL to limit the access behavior to specified file objects based on who(user/app), where, when and what. The fields of Context-aware ACL may include:
Perimeter protection: restrict an authorized user to carry out computer-related activities within an authorized container using authorized applications. This feature prevents leakage of data outside the container;
File Permission Analysis and tracking;
Automatically Encrypt/Decrypt File Content on-the-fly
Encrypt/decrypt processing in kernel driver layer, without impacting user behavior;
Support standard encryption algorithm,
Provide Secure Key Management Mechanism:
Use offline keys: keys are always available to the Agent regardless of whether it is connected to Manager or not. In this case a user needs to provide a secret (password, certificate etc.) to unlock offline keys;
Option to support external Key management system. The system provides key management API with KMIP-compliant to maintain encryption keys and algorithms. Customers can use BYOE system, key management system through this interface.
Only trusted applications that are authorized can read the plain-text file content, while the unauthorized application can only read cipher-text file content. Trusted application' is defined as a type of secure application which has credibility, including hash and certificate authentication, so it can effectively separate data maintaining and data content viewing of administrator user. Additionally, when trusted applications write files to disk, files contents are automatically encrypted. The behavior of a trusted application may be limited by File Manager 105 by any or all of limiting file operation, limiting writing disk type and limiting network access.

File Manager 105 automatically collects information about file access behavior and stores a log, both centrally and on each agent side and can export the log to an external audit system. File Manager 105 also interfaces to external analytics applications for analysis of user behavior.

File Manger 105 may search log records according to different fields and combination of fields and supports exporting search result to a file, support html/excel file format. File Manger 105 automatically analyzes log records to identify illegal behavior of file access based on predefined security policy and generate audit reports according to user's requirements in various formats including html and pdf on demand and on schedule.

Authentication of users on the agent side can be based on:
Independent or Native authentication (based on user pass authentication);
multi-factors authentication;
certificate authentication;
LDAP (lightweight directory access protocol); and
Windows authentication (AD (administrative domain) or local to system).

DPM Multi-Tenancy Manager 108

A Multi-Tenant Service Model is provided to ease management of DPM File Manager 105, DPM Key Manager 106, DPM Database Manager 107, DPM Token Manager 109, DPM Security Risk Controller 103, and DPM Fraud Predictor 104 when provided by hosting provider.

DPM Multitenancy Manager (MTM) 108 for multi-tenant hosting includes one or more capabilities:
Isolated tenancy—multiple instances of DPM File Manager (FM), Token Manager (TM), Key Manager (KM), Database Manager (DB), Security Risk Controller (SRC), and Fraud Predictor FP) with logical separation of customer data which are stored in independent virtual machine (VM) instances of DPM application and database instance;
Shared tenancy—multiple instances of DPM, with logical separation of customer data, which are stored in one shared database instance or one shared DPM application instance or shared DPM application/database;
Pre-packaged instances of DPM can be provided as software virtual appliances in format suitable for hosting providers;
Management, security features, separation of duties, other features are as previously described for DPM products such that configuration flexibility exists for end user and different types of tenants from the one DPM MTM platform; and
Graphical map of tenant locations and status.

In all cases, the separated customer data includes security policies, encryption keys, log records and other management data.

MTM provides an easy-to-use interface for customers to get cloud-managed file security service by themselves, including applying for the service, paying for the service, and so on.

MTM allows users to configure DPM software for all tenants, allowing users to:
Create and maintain hosting user, access, policy and auditing details;
Create and maintain tenant user, access, policy and auditing details;
View real-time dashboard, audit logging and status of tenants;
Maintaining and reporting tenant log consolidation;
Maintaining tenant licenses;
Interface to hosting provider billing system;
Interface from hosting provider's remote monitoring and management systems; and
Sending activity logs to hosting providers SIEMs.

DPM Key Manager

DPM Key Manager provides a central place to manage encryption keys and includes one or more of the following capabilities:

Full key and certificate lifecycle management (create, rotate, revoke and destroy);

Supports KMIP (Key Management Interoperability Protocol) for integration with client applications;

Integrates with DPM File and DPM Token Manager to provide key management;

Create, enforce and monitor policies for key generation, access control and auditing;

Storage and execution of DPM key manager application secrets in CPU hardware security assisted vaults on same platform in which DPM applications are running;

Integrates with an external key manager, SSM or HSM, QRNG and BYOE;

Policy engine for enterprise-wide key and certificate policy management for DPM and 3rd party applications and systems;

Dynamic enforcement of key and certificate policies based on Security Risk module;

Providing user access and audit information to DPM Fraud Predictor for identification of authorized user and associated key and certificate turning from "good" user to 'rogue".

Figure 7:
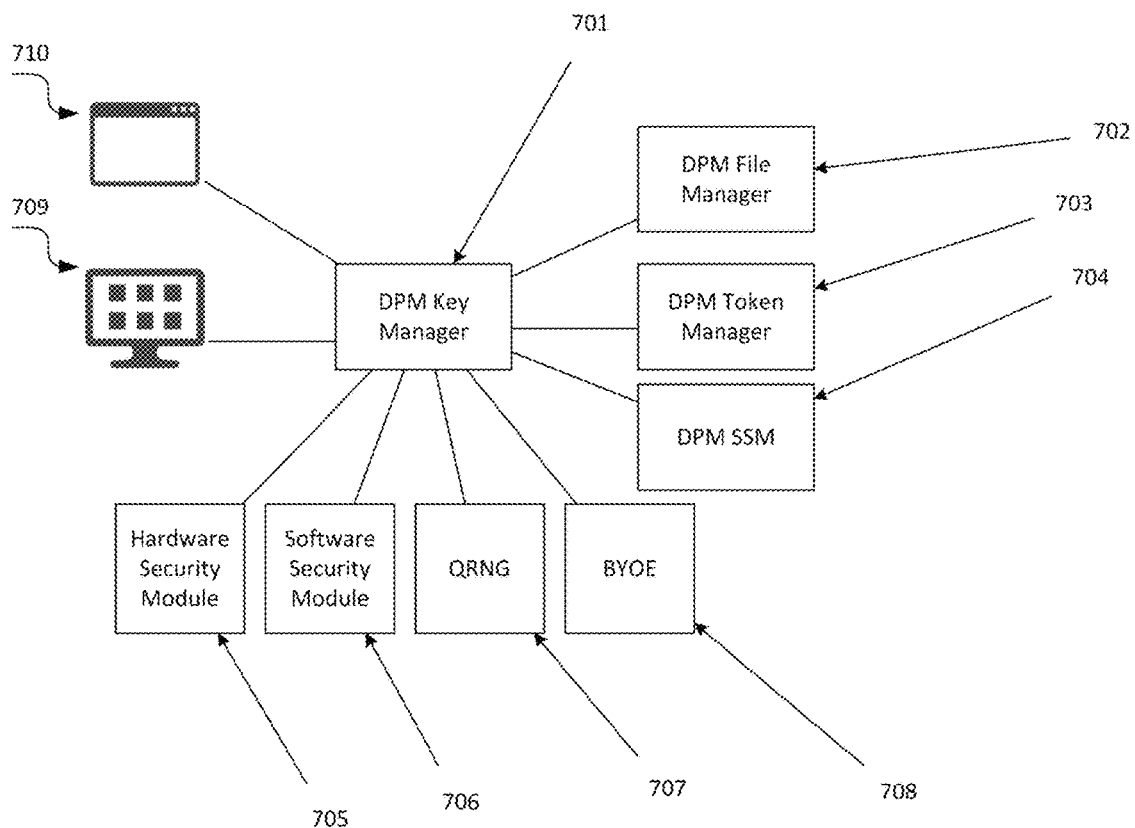
FIG. 7 provides an architecture diagram of a key manager.

FIG. 7 illustrates an architecture of DPM Key Manager 106. DPM Key Manager 701 can interface to external hardware security modules 705, software security modules 706, quantum random number generator 707 and external encryption algorithm provider (BYOE) to generate encryption keys. DPM Key Manager 701 can be used by DPM File Manager 702, DPM Token Manager 703 and DPM SSM 704 for key management. DPM Key Manager 701 provides a management console 709 which is used to configure system settings and data protection policies. DPM Key Manager 701 provides KMIP interface that can be used by client applications 710 to perform key management operations.

DPM Key Manager controls encryption keys and certificates via policies:

Key generation policy, based on key templates. Templates define attributes of keys and certificates such as algorithm, length, cryptographic mode, usage, activation and destroy dates and such;

Access control policy, which controls access to key groups per client and per KMIP operation. It can restrict date/time of access;

An Audit policy defines monitoring and reporting triggers for sending notifications and creating reports about access events.

DPM Key Manager management console 709 allows administrators to maintain the encryption keys and a KMIP interface for client applications to use the encryption keys.

DPM Key Manager 106 is an encryption and certificate management system which is compatible with OASIS KMIP (KMIP spec v1.1 or latest) (Key Management Interoperability Protocol TC), which is incorporated herein in its entirety by this reference thereto. Additionally, Key Manager provides options for non-FIPs, FIPs 140-2 Level 1, FIPs 140-2 Level 2 and FIPs 140-2 Level 3 (The Federal Information Processing Standard (FIPS) Publication 140-2) and Common Criteria Certified (EAL4+), both of which standards are incorporated herein in their entireties by this reference thereto. It performs management of the full lifecycle of encryption keys and certificates including generation, exchange, storage, access control, auditing and replacement of keys and basic certificates.

In an embodiment, DP Key Manager 701 is a software-based engine which can be used in standalone mode, SSM, HSMs and QRNG for security, offering the flexibility to add any encryption algorithm (BYOE) desired by the end user without supplier intervention. It can also be embedded to other DPM components that protect business-critical sensitive data used in File, email, Volume, Disk, Web, App and database applications in the cloud and on-premises.

DPM Key Manager 106 features high-availability, protected access to encryption keys, support for audit and compliance requirements, including scalability for multiple data centers, thousands of clients and hundreds of millions of keys in single tenant and multi-tenant applications in FIPS-140-2 Level 1 or 3 validated, Common Criteria EAL4+ and latest NIST (National Institute of Standards and Technology)-supported guidance standards.

DPM Token Manager (109)

DPM Token Manager 109 constitutes a high-performance tokenization engine and front-end console. Token Manager allows web and app server application and databases to tokenize, encrypt and anonymize data and apply masking policies for authorized and unauthorized users when retrieving sensitive data.

Figure 8:
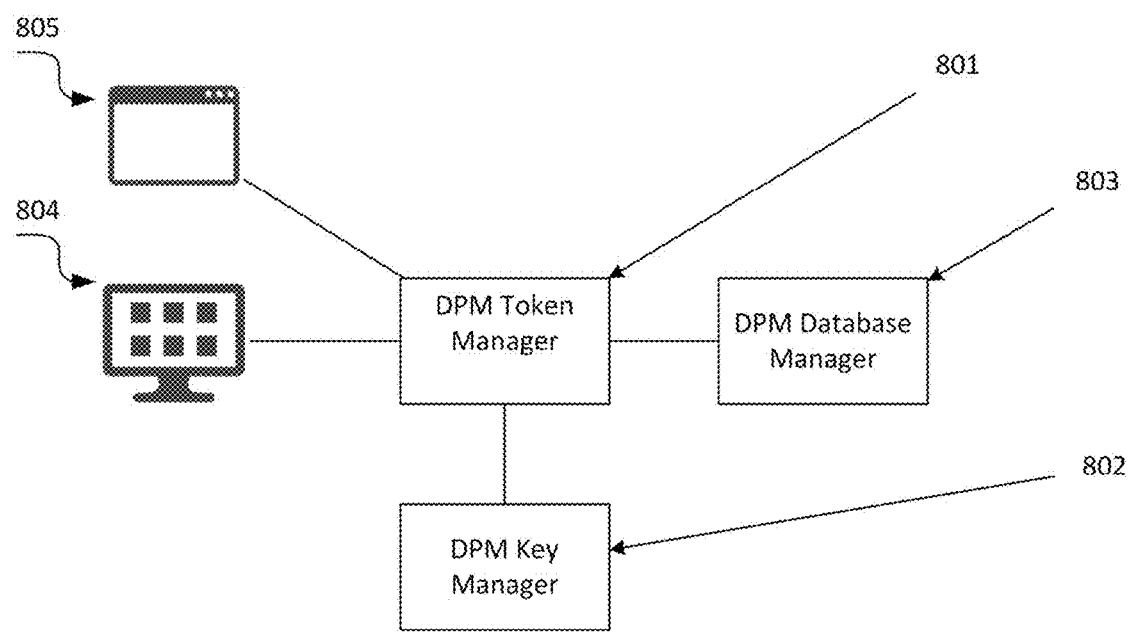
FIG. 8 provides an architecture diagram of a token manager.

FIG. 8 illustrates an architecture of DPM Token Manager 109. It includes DPM Token Manager Engine 80, which provides APIs that can be used by a client application 805 to request tokenization, encryption and anonymization operations. DPM Token Manager 801 interfaces to DPM Key Manager 802 to receive encryption keys. DPM Token Manager provides a management console 804 which is used to configure system settings and data protection policies. DPM Token Manager 801 can be used by DPM Database Manager 803 to perform tokenization of columns within databases.

The key functions of DPM Token Manager 109 are (1) to convert "real" data residing in app, web, databases and files into "fake" data and (2) to convert "real" data residing in app, web, databases and files into "format conserving or standard encryption" or into anonymized data based on the anonymization method used.

DPM Token Manager 109 thus provides the ability to replace sensitive data throughout an entire enterprise with surrogate values, called "tokens." Tokens are not derived from original data but have internal mappings. When a client application requests to de-tokenize a token, the original data is returned based on the mapping. Original sensitive data is securely stored and encrypted in a centralized token data vault. DPM Token Manager 109 provides encryption of the data and relies on an external key manager for encryption key generation and management.

As an option, instead of tokenization, DPM Token Manager 109 can provide a format conserving or standard encryption. With format conserving encryption, a cipher text has the same size and type as original data. With standard encryption, a cipher text is returned in encryption format depending on the algorithm used. When a client application makes an encryption request, sensitive data is encrypted and returned back to a client application in cipher text. DPM Token Manager 109 stores original data in encrypted form. When a client application requests to decrypt a cipher text value, DPM Token Manager 109 decrypts the value and provides clear text back. DPM Token Manager 109 provides encryption/decryption but relies on an external key manager for key generation and management.

In a stand-alone embodiment, token manager provides an individual user the ability to scrambling his/her personal identifying information to produce multiple fictitious identities that are each tokens of the original personal identifying information, mapping to the original true identify information. Additionally, token manager allows the user to easily manage the fictitious identities. By using this feature of token manager, the user has at his/disposal a collection of fictitious identities, any one of which can be provided when the user, for example, is downloading complementary call-to-action information products. In this way, the user is able to secure the information without compromising his/her identity or his/her data privacy. The use of the token identities also allows the user to escape the huge volume of targeted marketing activity that results from his/her web use behavior being monitored by advertisers.

DPM Token Manager 109 can also provide anonymized data based on the anonymization method. Anonymized data is not reversible. With anonymization, the anonymized data may or may not have the same size and type as original data. With anonymization, the anonymized data is returned in similar format depending on anonymization rule used. When a client application makes an anonymization request, sensitive data is anonymized and returned back to a client application in anonymized format. DPM Token Manager 109 may store original data in encrypted form depending on the anonymization method.

DPM Token Manager 109 provides an interface for external applications to tokenize/detokenize or encrypt/decrypt or anonymize data.

DPM Token Manager 109 can be managed through a management console or via APIs in which an administrator can configure tokenization, anonymization or encryption policies, access control, and other system configurations.

Tokens may be generated randomly, sequentially or may be based on a dictionary of tokens. A dictionary of tokens is a list of pre-generated or predefined values, from which a token is selected randomly during token generation and mapped to an original value. Tokens can be numeric, alphanumeric or alpha, with some other characters. Tokens can be single-byte or multi-byte. DPM Token Manager 109 can accept single-byte or multi-byte input data from various languages. Tokens and data can be mapped "1-to-1," which means that for the same input data the same token is generated within a policy; or "1-to-many" which means that for the same input data different tokens are generated within a policy.

Anonymization methods may include:
Hiding;
Masking;
Hashing;
Permutation;
Shift;
Truncation;
Prefix;
Suffix; and
Fictitious data.

DPM Token Manager 109 provides external interfaces for applications to use its functionality. External Interfaces include application programming interfaces via web services, socket interface, Java/.NET/C/C++ or other programming language libraries etc. as well as prebuilt agents. API functions include: tokenization, detokenization, encryption, masking, anonymization, search, delete, purge, restore, change policy and others.

DPM Token Manager 109 performs control over tokens and original data via policy configurations. Policy configurations include token format, access control policies, recycle policies, storage policies.

DPM Token Manager 109 performs authentication and enforces access control for client applications as follows:
Role-based access control (RBAC) for retrieving data;
Full, partial or no access for clear data;
Restrict access from specific IP/IP address range/subnet;
Enable/Disable API access for specific clients;
Default Masking for unauthorized users;
Custom Masking for specified users/groups; and
Require secret for each API request.

DPM Token Manager 109 provides audit and system information to DPM Security Risk Controller 103 and DPM Fraud Predictor 104. DPM Token Manager 109 is able to accept instructions from Security Risk Controller 103 and dynamically change and enforce policies as risk levels change.

DPM Security Risk Controller (SRC) 103

DPM Security Risk Controller (SRC) 103 is a module that dynamically modifies security policies in real time by increasing or reducing security levels for any of several data privacy measures based on computed internal and external security risk factors. DPM Security Risk Controller (SRC) 103 is context-aware application that monitors data related to who, what, whom, when and how, and based on the context data, computes a User Security Risk Factor (USRF), modifying system security policies by increasing or reducing security level of policies for encryption, masking, tokenization and anonymization on computed internal and external security risk factors.

Figure 3:
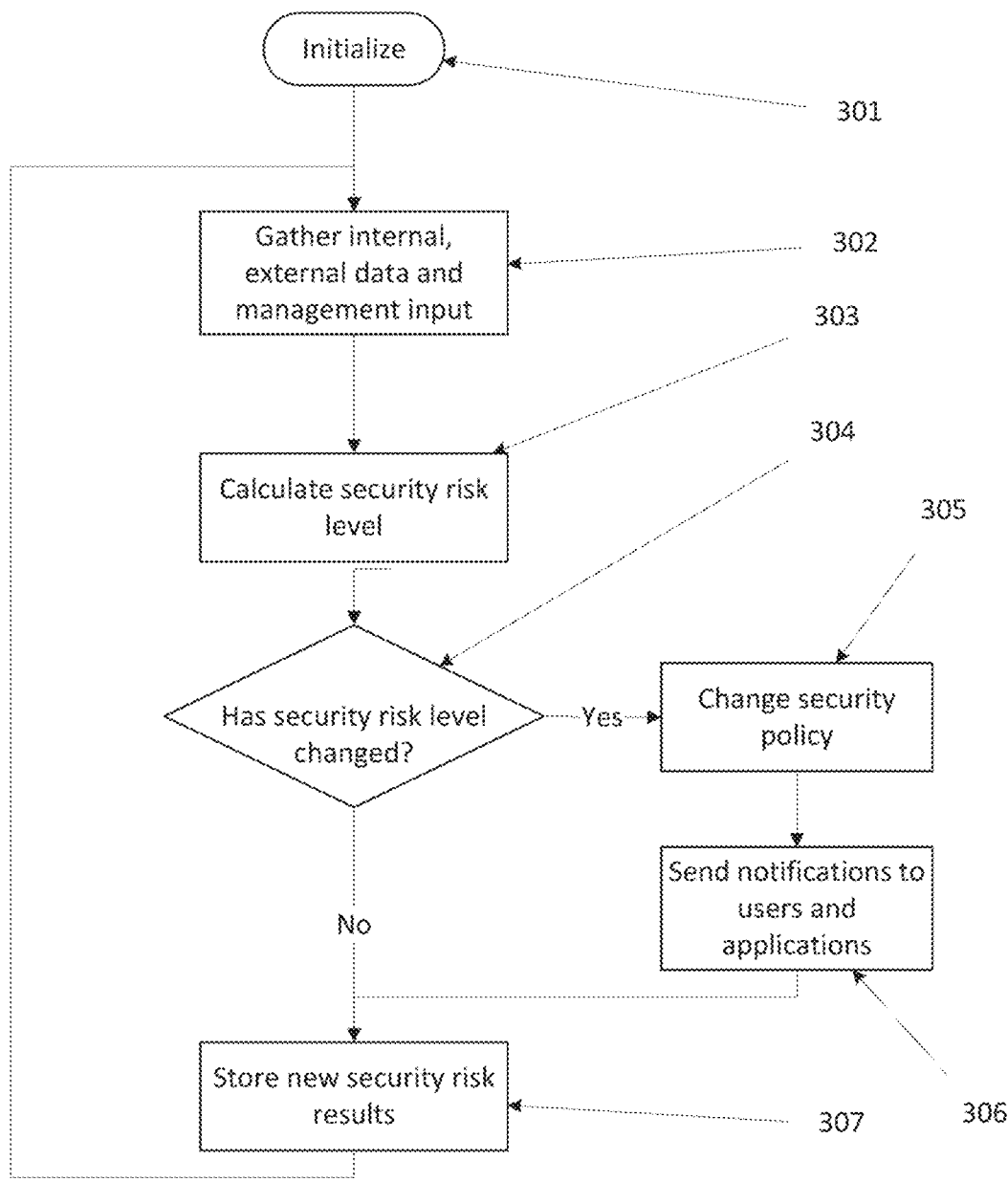
FIG. 3 provides a diagram of a method for performing a security risk analysis.

As per FIG. 3, one or more input security data are received from external or internal sources on a regular basis, used to compute USRF and stored in an SRC database. On initial setup, an SRC engine computes a baseline USRF based on configured policies, data classification, environment etc. and stores it in the SRC database. The current security risk is initialized as in step 301. In step 302, input data from external or internal sources or from management input is collected. Security information from various sources is used to compute current security risk level as per step 303 and a new USRF is written to the database in step 307. For each target system such as laptop/desktop, file server, application, database server their USRFs are computed separately. Based on computed USRF for each target system, a decision is made whether any action is required to be taken when a security risk level has changed as per step 304. A Security administrator of the SRC configures what DPM component and what target system, user or application is required to be notified and how in case the USRF is changed. A new policy is computed as per step 305 and notification is sent to relevant applications and users as per step 306.

Some examples of risk parameters that are used in generating a USRF are described herein below.

The SRC is able to accept external security alerts from third-party security products, such as intrusion detection and prevention systems (IPS), firewalls, routers, audit logs, behavior analytics applications, mobile phones, local laptops, servers, databases, social web applications and an API for external management of "what if" situations.

DPM enforcement agents employ a computed risk number to dynamically change policies according to the risk-level expectations of the enterprise. The User Security Risk Factor (USRF) is a numeric value computed mathematically by the SRC's algorithm using internal and external data sources and manually entered data as described below:

Internally—generated data is information received from other DPM components. For example, authorized user activity logs which include details such as user ID, date, time, location, activity duration, number of files encrypted, number of files with ACL policy, activity type, IP address, off-line/online status, Strict-online, encryption key, encryption key length, application white list, encryption level, activity of tokenization/detokenization, number of clients, performance, errors, etc.

Externally-acquired data is information collected from activity logs for devices, network, security appliances, databases, operating systems and application. Examples include: IDS/IPS status, Firewall state, Antivirus state, OS/apps patch level, installed and running apps list, CPU load, Memory load, Traffic load, Date/time, Group policies, Network type (public/private, lan/wireless), IP address, File content, Windows event log, Windows registry, firewall log, Windows Defender log, Tomcat access log, Apache access log, behavior analytics, applications and such.

Manual entry by enterprise security managers—qualitative data input into SRC based on known risk factors of employees, contractors, outsource providers, security tolerance and expectations and such.

Data can be collected via APIs of external systems, function calls, file monitoring, database monitoring, file system events interception, syslog or SNMP messages, network monitoring etc.

A baseline default policy is set for initial configurations for DPM components. That can be ACL and encryption policies for specific files/folders/network locations, masking and tokenization policies for applications and databases. DPM SRC uses input information and determines a baseline initial USRF as well as an ongoing risk factor for each DPM component and for each target sensitive system. An SRC administrator configures how each external or internal factor influences a USRF based on weight. The USRF computed number indicates a plurality of risk levels (for example: very low, low, moderate, high, very high) which, once computed is used by SRC to dynamically change user security policy via DPM enforcement agents. SRC communicates a new security level to DPM components to update and apply a security policy for a specific user, application or system.

The SRC algorithm utilizes best practice guidelines of ISO 270001, PCI DSS (Payment Card Industry Data Security Standard) and NIST (National Institute of Standards & Technology). The algorithm provides a security weighting per user, application, data classification, system, network environment etc.

DPM SRC allows security policies and level of data protection to be increased or decreased dynamically over time based on a risk factor. Risk parameters include information about target system, user and application so they can be isolated and relevant policies updated according to a new USRF in order to protect sensitive data. Risk parameters include:

A number of intrusion attempts (successful and unsuccessful) reported by an intrusion prevention/detection system or logged in a log file of the target system;

Firewall configurations collected from a firewall on the host system and information about open ports and failures to comply with company security policies;

Information about router configurations such as firmware patches level;

Information about host system such as operating system patch level, unnecessary software installation, detection of unauthorized services on the target system;

Database activity information such as permission changes for database users, data access, unusual transaction load that are recorded in database logs of the target system, unauthorized access attempts;

End user activity information of selected applications such as increased number of requests of specific data, increase in CPU and memory load;

File classification which is determined by a system user of DPM. File classification assigns a level of sensitivity for target folders and files;

Network configurations of the target system such as whether the system uses wired or wireless connection, VPN or Internet, its IP address, usage of proxy etc.;

Number of violations of configured security policies or increased number of data access by authorized and unauthorized users; and Information gathered from the internet about identified security issues with versions of products.

The above list is not exhaustive and represents only a few examples of risk parameters. Other risk parameters can also be used for calculation of USRF. These risk parameters can be selected to be monitored and included or not included when calculating USRF for each target system separately.

Notification methods include but are not limited to API calls, database data updates, configuration file updates, log files, syslog messages, SNMP (Simple Network Management Protocol) messages, emails, software warnings, pop-ups, etc. Notification information includes date/time, a new USRF, security risk level, target system details, user and application which require changes.

DPM enforcement agents use the USRF to dynamically change security policies and apply them at end points depending on the current protection method and risk level expectations of each enterprise. Dynamic Policy change examples include changing ACL levels, changing encryption levels, revoking keys, totally stopping encryption/decryption, changing offline to strict on-line, stopping offline use, slowing performance of tokenization/detokenization, increasing audit levels, changing to predefined policies based on possible known situation changes, demanding multi-factor authentication and such.

DPM Fraud Predictor (104)

Under normal circumstances in a protected environment unauthorized users are unable to access and decrypt any sensitive data. Authorized users are able to encrypt/decrypt, tokenize/detokenize, mask/reveal, anonymize/de-anonymize sensitive data required for their job, however, from time to time these same "good" users become "rogue" due to situational changes (planning to leave company, substance abuse started, financial situation change, discontent with management, etc.). Rogue users are users who have permissions to access sensitive data, however, use it not for their job but for other personal interest.

DPM Fraud Predictor (FP) 104 collects, analyzes and predicts, that is, identifies those authorized users and applications whose behavior is turning to be fraudulent in nature.

Figure 4:
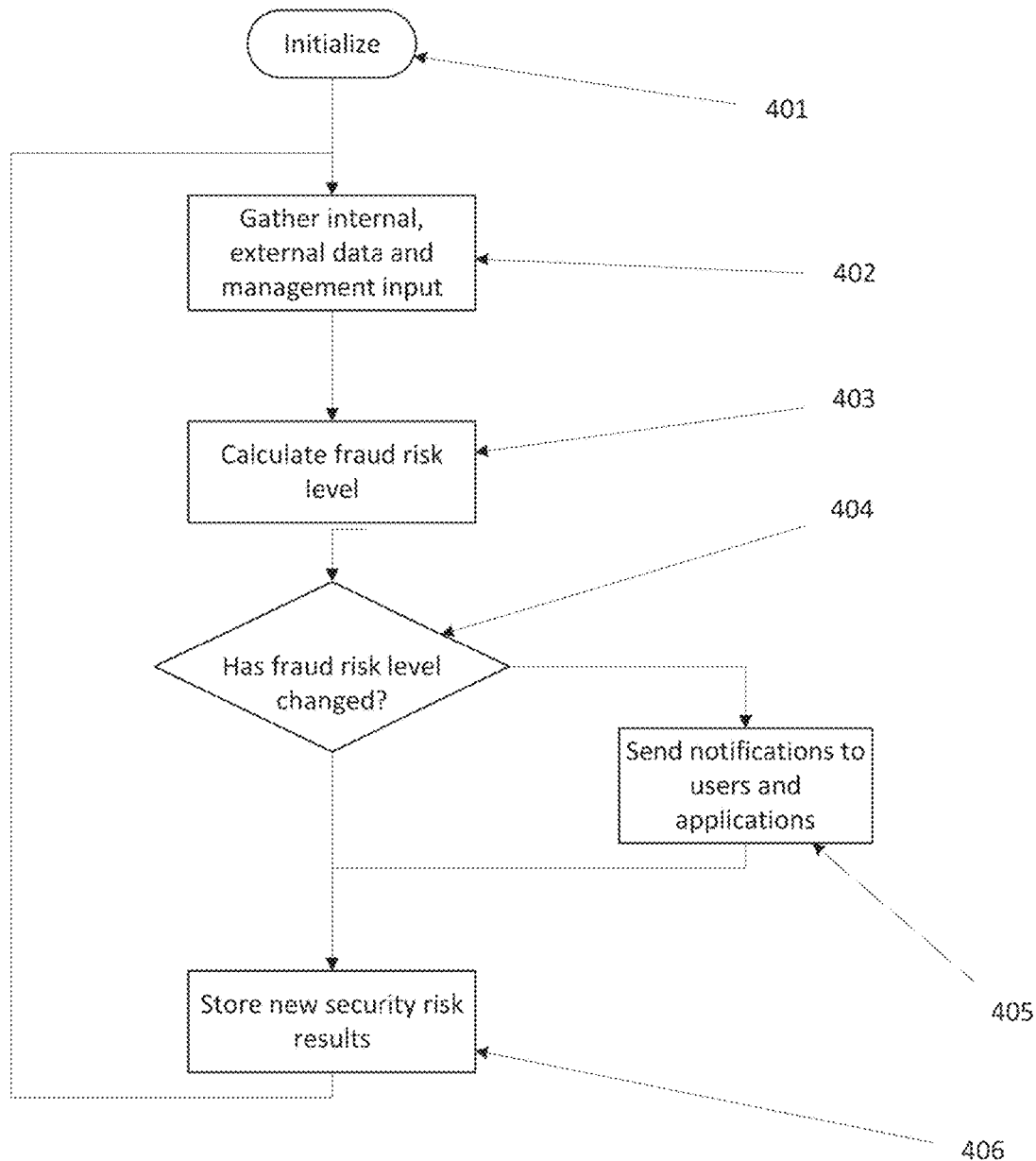
FIG. 4 provides a diagram of a method for performing a fraud risk analysis.

FIG. 4 illustrates an exemplary method to predict fraud users in target systems. For each user a baseline level is set for initial configurations for each system and each policy in all DPM components as per initialization step 401. An initial configuration, for example, can be indicator of a user's activity, such as a number of access events to a specific folder within a specified period of time, a duration of time when a document is used by an application, a number of tokenization requests for a specific applications, a number of installed applications within a system, a number of intrusion events per day, and so on. DPM FPE 104 uses input information and computes a baseline fraud risk level. After that, input information from external, internal sources or management input is gathered as per step 402 and used to compute current fraud risk level for each user in each target sensitive system as per step 403.

An FP administrator configures how each type of external or internal input data influences calculations of allowed user access level and fraud risk level. The FP administrator also configures what action should take place when a fraud risk is identified: what target system, person or application is required to be notified and in what manner, in case a fraud risk level exceeds a configured level. If a fraud risk level change is identified in step 404, a notification is sent to relevant applications and users as per step 405. All results of fraud risk calculations and notifications are stored in database as per step 406.

The FP analytical data inputs are its own internal activity records and external security audit data from externally-supplied security products as well as manual input from management as described below.

Internal: information received from other DPM components. For example, authorized user activity logs which include details such as user ID, date, time, location, activity duration, number of files encrypted, number of files with ACL policy, activity type, IP address, off-line/online status, Strict-online, encryption key, encryption key length, application white list, encryption level, activity of tokenization/detokenization, number of clients, performance, errors, etc.

External: collected activity logs, that is from devices, network, security appliances, databases, operating systems and application. Examples include IDS/IPS status, Firewall state, Antivirus state, OS/apps patch level, Installed and running Apps list, CPU load, Memory load, Traffic load, Date/time, Group policies, Network type (public/private, lan/wireless), social web sites, IP address, File content, Windows event log, Windows registry, firewall log, Windows Defender log, Tomcat access log, Apache access log, behavior analytics, etc.

Manual entry by enterprise security managers: qualitative data input into FPE based on known risk factors of employees, contractors, outsource providers, security tolerance and expectations, etc.

Input data can be collected via APIs of the external systems, function calls, file monitoring, database monitoring, file system events interception, syslog or SNMP messages, network monitoring etc.

Notification methods include but are not limited to API calls, database data updates, configuration files updates, log files, syslog messages, SNMP messages, emails, software warnings, pop ups etc. Notification information includes date/time, a fraud risk level, target system details, user, and an application in question.

DPM FP 104 provides real time alerts based on trigger points and pre-configured regular reports of possible rogue users requiring further monitoring. FP also enables feedback into SRC for automating prevention by dynamically changing policies.

Figure 9:
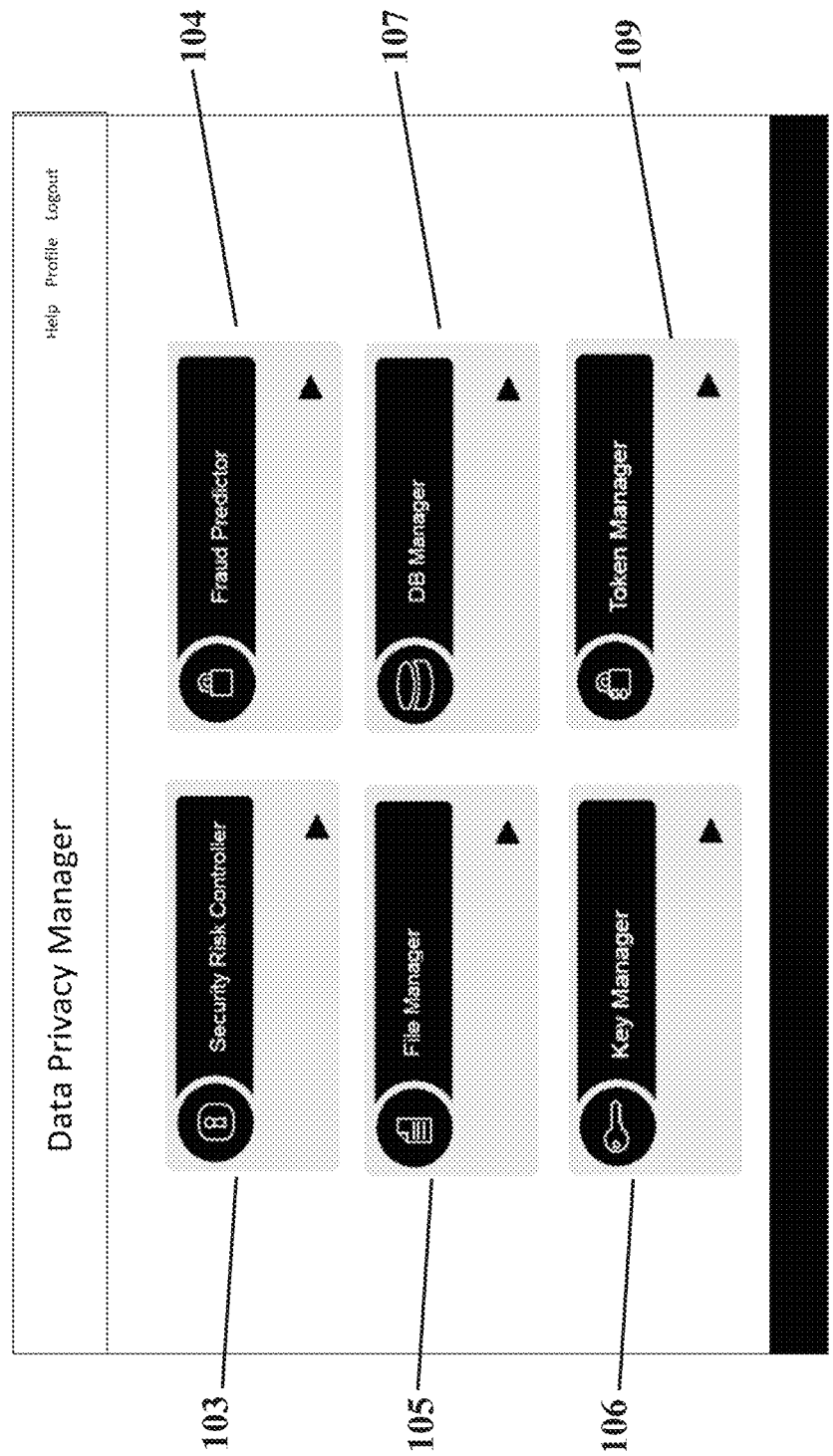
FIG. 9 provides a screenshot of a top-level management console for DPM.

FIG. 9 provides a screenshot of an exemplary embodiment of a top-level management console 900 for accessing the individual components of DPM. As shown, separate user interface devices are provided, activation of which navigates a user to the desired component. Shown are the Security Risk Controller 103, the Fraud Predictor 104, the File Manager 105, the Key Manager 106, the Token Manager 108, the Database Manager 107 and the Multi-tenancy Manager 109.

Figure 10:
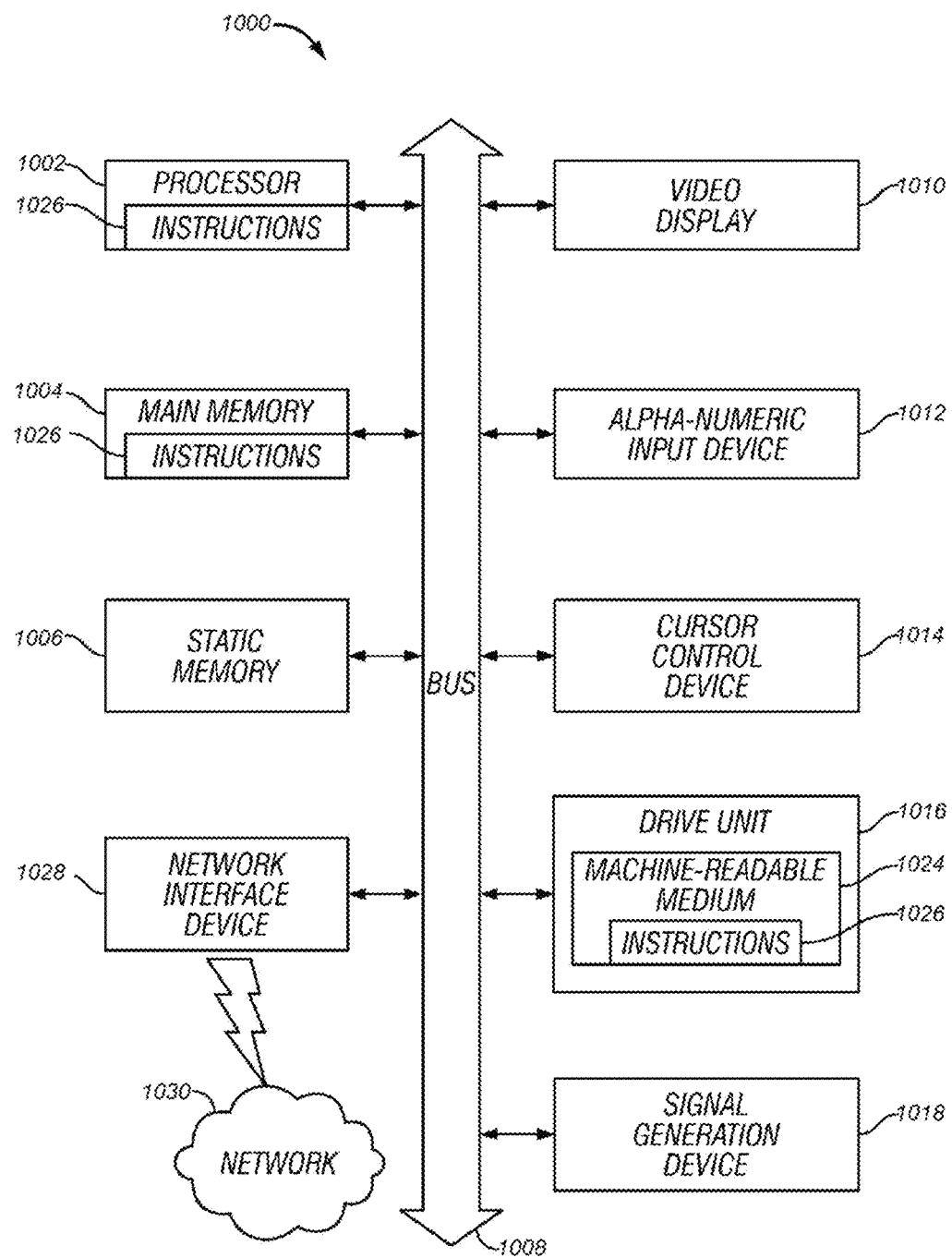
FIG. 10 provides a diagram of a machine in the exemplary form of a computer system within which a set of instructions, for causing the machine to perform any one of the methodologies discussed herein below, may be executed.

Referring now to FIG. 10, shown is a diagrammatic representation of a machine in the exemplary form of a computer system 600 within which a set of instructions for causing the machine to perform any one of the methodologies discussed herein may be executed. In alternative embodiments, the machine may comprise a network router, a network switch, a network bridge, personal digital assistant (PDA), a cellular telephone, a web appliance or any machine capable of executing a sequence of instructions that specify actions to be taken by that machine.

The computer system 1000 includes a processor 1002, a main memory 1004 and a static memory 1006, which communicate with each other via a bus 1008. The computer system 1000 may further include a display unit 1010, for example, a liquid crystal displays (LCD) or a cathode ray tube (CRT). The computer system 1000 also includes an alphanumeric input device 1012, for example, a keyboard; a cursor control device 1014, for example, a mouse; a disk drive unit 1010, a signal generation device 1018, for example, a speaker, and a network interface device 1028.

The disk drive unit 1016 includes a non-transitory machine-readable medium 1024 on which is stored a set of executable instructions, i.e. software, 1026 embodying any one, or all, of the methodologies described herein. The software 1026 is also shown to reside, completely or at least partially, within the main memory 1004 and/or within the processor 1002. The software 1026 may further be transmitted or received over a network 1030 by means of a network interface device 1028.

In contrast to the system 1000 discussed above, a different embodiment uses logic circuitry instead of computer-executed instructions to implement processing the various methodologies herein described. Depending upon the particular requirements of the application in the areas of speed, expense, tooling costs, and the like, this logic may be implemented by constructing an application-specific integrated circuit (ASIC) having thousands of tiny integrated transistors. Such an ASIC may be implemented with CMOS (complementary metal oxide semiconductor), TTL (transistor-transistor logic), VLSI (very large scale integration), or another suitable construction. Other alternatives include a digital signal processing chip (DSP), discrete circuitry (such as resistors, capacitors, diodes, inductors, and transistors), field programmable gate array (FPGA), programmable logic array (PLA), programmable logic device (PLD), and the like.

It is to be understood that embodiments of this invention may be used as or to support software programs executed upon some form of processing core (such as the Central Processing Unit of a computer) or otherwise implemented or realized upon or within a machine or computer readable medium. A machine-readable medium includes any mechanism for storing or transmitting information in a form readable by a machine, e.g. a computer. For example, a machine readable medium includes read-only memory (ROM); random access memory (RAM); magnetic disk storage media; optical storage media; flash memory devices; electrical, optical, acoustical or other form of propagated signals, for example, carrier waves, infrared signals, digital signals, etc.; or any other type of media suitable for storing or transmitting information.

While the foregoing written description of the embodiments enables one of ordinary skill to make and use a system as described, those of ordinary skill will understand and appreciate the existence of variations, combinations, and equivalents of the specific embodiments, methods, and examples herein. The specification described here should therefore not be limited by the above described embodiments, method, and examples, but by all embodiments and methods within the scope and spirit of the attached claims.

The invention claimed is:

1. A system for managing data privacy, comprising:
   a processor; and
   a memory, the memory having stored therein:

a plurality of security modules for provision of at least one data privacy measure for protection of data, the plurality of security modules including at least a token manager and a database manager,
wherein said database manager performs operations of:
  masking column-level data with no application code changes;
  integrating with said token manager for tokenization, standard encryption, format preserving encryption and anonymization;
  dynamic tokenization, anonymization and masking rules;
a security risk controller (SRC) for dynamically modifying security policies, which, when executed by the processor, performs operations of:
  receiving one or both of context data and environmental information from said at least one security module;
  determining, in real time, at least one internal security risk factor from the context data; and
  responsive to said determining, modifying, in real time, a security policy for the at least one data privacy measure;
  said database manager further performing an operation of dynamically enforcing security policy enforcement by the Security Risk Controller;
the memory having further stored therein:
  a fraud predictor for identifying and reporting users at risk for engaging in malicious behavior, which when executed by the processor performs operations of:
  receiving a plurality of inputs regarding user behavior; and
  analyzing the inputs to identify authorized users/applications displaying anomalous behavior that indicates a malicious propensity;
  said database manager further performing an operation of identifying authorized and unauthorized users' activities for said Fraud Predictor;
wherein role-based, need-to-know access is granted only to specific users or groups of users or applications for ensuring data protection; and
wherein the system is capable of managing the at least one data privacy measure without requiring code changes and without requiring users to modify their computing behavior.

2. The system of claim 1, wherein the at least one internal security risk factor comprises a User Security Risk Factor (USRF), the USRF comprising a numeric value algorithmically computed using internal and external data sources and manually-entered data.

3. The system of claim 1, wherein the environmental information comprises information internal to said system, the internal information being received from said at least one security module for provision of at least one data privacy measure for protection of data and comprising data regarding any of:
  users or applications,
operations initiated by the users or applications and the object or objects of each operation, including any of:
  authorized user activity logs which include details that includes any of: user ID, date, time, location, activity duration, number of files encrypted, number of files with ACL policy, activity type, IP address, off-line/online status, Strict-online, encryption key, encryption key length, application white list, encryption level, activity of tokenization/detokenization, number of clients and performance errors.

4. The system of claim 2, further comprising at least one enforcement agent configured for dynamically changing policies based on the USRF according to risk level expectations.

5. The system of claim 2, wherein the operation of determining, in real time, at least one internal security risk factor from the context data comprises:
  computing a baseline USRF based on environmental information and at least one of configured policies and data classification;
  storing the baseline USRF;
  collecting input data from external and/or internal sources and/or from management input;
  computing a current USRF; and
  storing the current USRF.

6. The system of claim 5, wherein the operation of determining, in real time, at least one internal security risk factor from the context data further comprises:
  determining an action to be taken if a current USRF value changes from a previous USRF value;
  computing a new policy based on the change in the USRF value;
  sending notification to relevant entities of the changed USRF value and the new policy.

7. The system of claim 5, wherein the operation of determining, in real time, at least one internal security risk factor from the context data further comprises:
  separately computing a separate USRF value for each of least one device under management.

8. The system of claim 1, wherein said fraud predictor further performs operations of:
  setting, for each user, a baseline level for initial configurations for each of at least one system and each policy in all system components;
  receiving inputs from any of external sources, internal sources and management input regarding a user's behavior; and
  computing a current fraud risk level for each user in each of at least one target system.

9. The system of claim 1, wherein the fraud predictor performs additional operations of:
  providing real-time alerts based on trigger points;
  providing regular pre-configured reports of possible rogue users requiring further monitoring so as to explicitly identify imminent fraud;
  providing feedback to the SRC for automating prevention by dynamically changing policies.

10. The system of claim 1, wherein said at least one security module further comprises at least one of:
  a token manager;
  a file manager;
  a key manager;
  a database manager; and
  a multi-tenancy manager;
  wherein said at least one security module interfaces to external 3rd party security components and software and internal security components to receive environment information.

11. The system of claim 10, wherein the external security components include any of:
  at least one intrusion prevention system;
  at least one firewall;
  at least one router;
  one or more device activity logs;
  one or more operating system logs;

one or more database activity logs;
one or more application activity logs; and
output from at least one behavior analytics module;
wherein the security risk controller, based on audit data input by the external security components, output one or more "what if" scenarios.

12. The system of claim 11, wherein the token manager is configured for providing an interface for external applications to tokenize/detokenize or encrypt/decrypt data; and wherein said token manager performs operations of:
replacing data with tokens, the tokens comprising surrogate values mapped to the replaced data;
responsive to a de-tokenization request, returning the data mapped to the surrogate values;
format-conserving tokenization and format-conserving encryption, wherein a token value or cipher text has a same size as the original data; and
non-format conserving tokenization and non-format conserving encryption.

13. The system of claim 10, wherein the token manager performs operations of:
providing an individual user an ability of scrambling his/her personal identifying information to produce multiple fictitious identities that are each tokens of the original personal identifying information, mapping to original personal identifying information; and
allowing the individual user to easily manage the fictitious identities.

14. The system of claim 10, wherein said file manager performs operations of:
implementing fine-grained access control mechanisms to protect files stored within an enterprise network;
whitelisting and blacklisting applications;
encrypting and decrypting files, folders and full databases; and
simplifying management of file access rights configurations.

15. The system of claim 10, wherein said database manager performs further operations of:
integrating with 3rd party Data Classification systems for structured data to automatically enforce policies according to an enterprise classification policy; and
integrating with 3rd party sensitive data identification systems for structured data to automatically enforce Data Privacy Manager (DPM) policies per enterprise wide sensitive data location policies.

16. The system of claim 10, wherein said multi-tenancy manager simplifies management of multiple instances of said system in multi-tenant hosting environments and wherein said multi-tenancy manager performs operations of:
logically separating customer data stored in independent virtual machine instances of the system and a database;
logically separating customer data stored in one share database instance or one shared system instance or a shared system/database;
enabling configuration flexibility for end users and different tenant types from a single platform;
mapping tenant locations and status.

17. The system of claim 10, wherein said key manager provides a central place to manage encryption keys and wherein said key manager performs operations of:
managing an entire key and certificate lifecycle management;
supporting KMIP (Key Management Interoperability Protocol) for integration with client applications;
integrating with file manager and token manager to provide key management;
creating, enforcing and monitoring policies for key generation, access control and auditing;
integrating with an external key manager, Software Security Module (SSM) or Hardware Security Module (HSM), Quantum Random Number Generator (QRNG) and bring your own encryption algorithm (BYOE);
serving as a policy engine for enterprise-wide key and certificate policy management for Data Privacy Manager (DPM) and 3rd party applications and systems;
dynamically enforcing of key and certificate policies based on Security Risk Controller; and
providing user access and audit information to the Fraud Predictor for identification of authorized user and associated key and certificate turning from "good" user to 'rogue'.

18. The system of claim 10, wherein at least one of the key manager and the file manager perform at least one of:
storing and executing key manager application secrets in CPU hardware security-assisted vaults on a same platform in which Data Privacy Manager (DPM) applications are running; and
enforcing confidentiality and integrity even in compromised systems of privileged malware at an operating system (OS) and BIOS (basic input/output system) of physical and virtualized computers by means of hardware-assisted containerization.

19. A computer-implemented method for managing data privacy without requiring code changes and without requiring users to modify their computing behavior comprising:
a plurality of security modules collecting context data regarding at least one privacy measure for protection of data, said plurality of security modules including at least a database manager and a token manager;
a security risk controller receiving said context data responsive to transmission thereto by said at plurality of security modules;
the security risk controller determining, in real time, at least one internal security risk factor from the context data; and
responsive to said determining, modifying, in real time, a security policy for the at least one data privacy measure, said database manager further performing an operation of dynamically enforcing security policy enforcement by the security risk controller;
said database manager performing an operation of identifying authorized and unauthorized users' activities for a fraud predictor;
the fraud predictor receiving a plurality of inputs regarding user behavior; and
responsive to receiving said inputs regarding user behavior:
analyzing the inputs to identify authorized users/applications displaying anomalous behavior that indicates a malicious propensity;
identifying and reporting users at risk for engaging in malicious behavior; and
granting access only to specific users or groups of users or applications for ensuring data protection based on said internal risk factor and output of said fraud predictor;
further comprising steps of:
said database manager masking column-level data with no application code changes;
said database manager integrating with said token manager for tokenization, standard encryption, format preserving encryption and anonymization; and
said database manager performing operations of dynamic tokenization, anonymization and masking rules.

20. A non-transitory computer-readable medium storing instructions, wherein the instructions, when executed by a computer system, cause the computer system to perform a method, the method comprising:
- a plurality of security modules collecting context data regarding at least one privacy measure for protection of data, said plurality of security modules including at least a database manager and a token manager;
- a security risk controller receiving said context data responsive to transmission thereto by said at plurality of security modules;
- the security risk controller determining, in real time, at least one internal security risk factor from the context data; and
- responsive to said determining, modifying, in real time, a security policy for the at least one data privacy measure, said database manager further performing an operation of dynamically enforcing security policy enforcement by the security risk controller;
- said database manager performing an operation of identifying authorized and unauthorized users' activities for a fraud predictor;
- the fraud predictor receiving a plurality of inputs regarding user behavior; and
- responsive to receiving said inputs regarding user behavior:
- analyzing the inputs to identify authorized users/applications displaying anomalous behavior that indicates a malicious propensity;
- identifying and reporting users at risk for engaging in malicious behavior; and
- granting access only to specific users or groups of users or applications for ensuring data protection based on said internal risk factor and output of said fraud predictor;
- further comprising steps of:
- said database manager masking column-level data with no application code changes;
- said database manager integrating with said token manager for tokenization, standard encryption, format preserving encryption and anonymization; and
- said database manager performing operations of dynamic tokenization, anonymization and masking rules.

* * * * *